US009699465B2

(12) United States Patent
Ouedraogo et al.

(10) Patent No.: US 9,699,465 B2
(45) Date of Patent: Jul. 4, 2017

(54) METHOD AND DEVICE FOR PARTITIONING AN IMAGE

(71) Applicant: CANON KABUSHIKI KAISHA, Tokyo (JP)

(72) Inventors: Naël Ouedraogo, Maure-de-Bretagne (FR); Eric Nassor, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 14/251,442

(22) Filed: Apr. 11, 2014

(65) Prior Publication Data

US 2014/0307775 A1    Oct. 16, 2014

(30) Foreign Application Priority Data

Apr. 16, 2013    (GB) .................................. 1306889.5

(51) Int. Cl.
*H04N 19/119*    (2014.01)
*H04N 19/159*    (2014.01)
(Continued)

(52) U.S. Cl.
CPC ........... *H04N 19/17* (2014.11); *H04N 19/119* (2014.11); *H04N 19/159* (2014.11); *H04N 19/167* (2014.11)

(58) Field of Classification Search
CPC .. H04N 19/119; H04N 19/159; H04N 19/167; H04N 19/17
(Continued)

(56) References Cited

U.S. PATENT DOCUMENTS

2007/0183676 A1* 8/2007 Hannuksela ......... H04N 19/174
382/243
2008/0013621 A1* 1/2008 Wang .................... H04N 19/70
375/240.01
(Continued)

FOREIGN PATENT DOCUMENTS

| WO | 03/047266 A1 | 6/2003 |
| WO | 2008/007304 A2 | 1/2008 |
| WO | 2009/119888 A1 | 10/2009 |

OTHER PUBLICATIONS

ITU-T. "Series H: Audiovisual and Multimedia Systems, Infrastructure of audiovisual services—Coding of moving video." Recommendation ITU-T H.265, HEVC Draft Specification, v10. (Apr. 2013) pp. 18-25. Available at http://www.itu.int/rec/T-REC-H.265-201304-I.

Primary Examiner — Behrooz Senfi
(74) Attorney, Agent, or Firm — Canon USA, Inc. I.P. Division

(57) ABSTRACT

A method and device for partitioning an image for transmission of one or more regions of interest of said image, the image being composed of coding units, the method comprising:
performing a first partitioning of the image into one or more portions of coding units, wherein each portion is encodable or decodable without any coding dependency on another of the portions, a region of interest comprising at least one portion; and
performing a second partitioning the image onto one or more segments of coding units comprising at least one independent segment which is encodable or decodable without any coding dependency on another of the segments and at least one dependent segment which is dependent on the independent segment for coding or decoding, the second partitioning being based on the portions of the first partitioning;
(Continued)

wherein at least part of one of the portions is encoded in an independent segment and at least part of another of the portions is encoded in a dependent segment.

15 Claims, 10 Drawing Sheets

(51) Int. Cl.
  *H04N 19/17* (2014.01)
  *H04N 19/167* (2014.01)
(58) Field of Classification Search
  USPC .................................................. 375/240.02
  See application file for complete search history.

(56) References Cited

U.S. PATENT DOCUMENTS

| | | | | |
|---|---|---|---|---|
| 2008/0055463 | A1* | 3/2008 | Lerner | H04N 21/2365 348/420.1 |
| 2010/0027680 | A1* | 2/2010 | Segall | H04N 19/119 375/240.24 |
| 2012/0189049 | A1* | 7/2012 | Coban | H04N 19/197 375/240.02 |
| 2012/0230397 | A1* | 9/2012 | Ouedraogo | H04N 19/70 375/240.03 |
| 2014/0003504 | A1* | 1/2014 | Ugur | H04N 19/00757 375/240.12 |
| 2014/0016703 | A1* | 1/2014 | Denoual | H04N 19/00696 375/240.16 |
| 2014/0086306 | A1* | 3/2014 | Esenlik | H04N 19/46 375/240.02 |
| 2014/0092955 | A1* | 4/2014 | Wang | H04N 19/70 375/240.02 |
| 2014/0218473 | A1* | 8/2014 | Hannuksela | H04N 19/597 348/43 |
| 2014/0254681 | A1* | 9/2014 | Aminlou | H04N 19/105 375/240.16 |
| 2015/0208095 | A1* | 7/2015 | Schierl | H04N 19/70 375/240.28 |
| 2015/0256838 | A1* | 9/2015 | Deshpande | H04N 19/70 375/240.02 |

\* cited by examiner

METHOD AND DEVICE FOR PARTITIONING AN IMAGE

REFERENCES TO RELATED APPLICATIONS

This application claims the benefit under 35 U.S.C. §119 (a)-(d) of United Kingdom Patent Application No. 1306889.5, filed on Apr. 16, 2013 and entitled "method and device for partitioning an image". The above cited patent application is incorporated herein by reference in its entirety.

FIELD OF THE INVENTION

The present invention relates to a method and device for partitioning an image. Particularly, the invention relates to a method and device for partitioning an image including at least one region of interest.

BACKGROUND OF THE INVENTION

Video data is typically composed of a series of still images which are shown rapidly in succession as a video sequence to give the idea of a moving image. Video applications are continuously moving towards higher and higher resolution. A large quantity of video material is distributed in digital form over broadcast channels, digital networks and packaged media, with a continuous evolution towards higher quality and resolution (e.g. higher number of pixels per frame, higher frame rate, higher bit-depth or extended colour gamut). This technological evolution puts higher pressure on the distribution networks that are already facing difficulties in bringing HDTV resolution and high data rates economically to the end user.

Video coding techniques typically use spatial and temporal redundancies of images in order to generate data bit streams of reduced size compared with the video sequences. Spatial prediction techniques (also referred to as Intra coding) exploit the mutual correlation between neighbouring image pixels, while temporal prediction techniques (also referred to as INTER coding) exploit the correlation between images of sequential images. Such compression techniques render the transmission and/or storage of the video sequences more effective since they reduce the capacity required of a transfer network, or storage device, to transmit or store the bit-stream code.

An original video sequence to be encoded or decoded generally comprises a succession of digital images which may be represented by one or more matrices the coefficients of which represent pixels. An encoding device is used to code the video images, with an associated decoding device being available to reconstruct the bit stream for display and viewing.

Common standardized approaches have been adopted for the format and method of the coding process. One of the more recent standards is HEVC, in which a video image is partitioned into smaller portions of pixels known as Coding Units (sometimes referred to as macroblocks or blocks of pixels). The coding units can be partitioned and adjusted according to the characteristics of the original image segment under consideration. This allows more detailed coding of areas of the video image which contain relatively more information and less coding effort for those areas with fewer features.

Images of video sequence may include regions of the image often referred to as a region of interest (ROI). Some video data provider systems provide video data of video sequences provided with ROI functionalities enabling a remote user to access one or more ROIs which may be predetermined or determined according to the request of the user. Such systems typically comprise a video server associated with a database of correlated video sequences. One such video sequence may comprise an overview video sequence with clickable subparts (ROIs). Other video sequences in the database may correspond to one or more regions of interest of the first video sequence in a higher resolution, for example, also referred to as zoomed versions. Such videos sequences are often referred to as ROI videos. One application of interactive regions of interest may be for instance a preview of a video provided to a client that can select one region of interest in order to obtain higher quality video data for the selected region.

One concern in the transmission of video data having one or more ROIs is how to transmit video data corresponding to a region of interest to a user with a low overhead.

SUMMARY OF THE INVENTION

The present invention has been devised to address one or more of the foregoing concerns.

According to a first aspect of the invention there is provided a method of partitioning and encoding an image for transmission of one or more regions of interest of said image, the image being composed of coding units, the method comprising:
  performing a first partitioning of the image into two or more portions of coding units, wherein each portion is encodable or decodable without any coding dependency on another of the portions, a region of interest comprising at least one portion; and
  performing a second partitioning the image onto two or more segments of coding units comprising at least one independent segment which is encodable or decodable without any coding dependency on another of the segments and at least one dependent segment which is dependent on the independent segment for coding or decoding, the second partitioning being based on the portions of the first partitioning, at least one segment being employed per portion;
  encoding the image according to said first and second partitioning;
  wherein at least part of one of the portions is encoded in the independent segment and at least part of another of the portions is encoded in the dependent segment.

Reduced overhead can thereby be provided since the number of independent segments transmitted may be limited.

In the context of HEVC a portion may correspond to a tile and a segment may correspond to a slice segment.

The first partitioning may partition the image in such a way that spatial random access to sub parts of the image or/and such that parallel encoding or decoding is enabled.

In an embodiment, the first portion of the image, exactly one segment being used for each portion, according to a decoding order, is encoded in an independent segment and subsequent portions of the image are encoded in a respective dependent segment.

In an embodiment, the one or more regions of interest are predetermined.

In an embodiment, exactly one segment being used for each portion, the first portion of a said region of interest is encoded in an independent segment.

In an embodiment, the maximum size of the portions is set to the size of the smallest region of interest of the image.

In an embodiment, the size of an independent segment is set to a selected size of at least one coding unit.

In an embodiment, the size of an independent segment is set to the selected size of one coding unit.

In an embodiment, coding units of part of a portion are encoded in an independent segment and the coding units of the other part of the portion are encoded in at least one dependent segment.

In an embodiment, the encoded size of the first coding unit of each portion are compared to one another, and the first coding unit of the smallest size is encoded in an independent segment.

In an embodiment, the method includes, in response to a request for a region of interest of the image transmitting an independent segment associated with said region of interest.

In an embodiment, the method includes in response to the request for an ROI: determining one or more segments of the image corresponding to the requested ROI; determining whether or not the one or more segments includes an independent segment; and in the case where the one or more segments excludes an independent segment; selecting an independent segment of the image for transmission with the dependent segment.

In an embodiment, the selected independent segment corresponds to the independent segment of the image having the smallest encoding size.

In an embodiment, the independent segment preceding the first dependent segment of the region of interest in decoding order is selected.

In an embodiment, the independent segment including said coding unit of the smallest size is selected.

In an embodiment, each independent segment is provided with the same header.

A second aspect of the invention relates to a method of requesting a region of interest of an image wherein the image is partitioned in accordance with the method of any embodiment of the first aspect of the invention, the method comprising:

transmitting a request for the region of interest; and receiving in response to the request for the region of interest an independent segment associated with the requested region of interest and at least one dependent segment of the image corresponding to the requested region of interest; and decoding the independent segment before decoding the one or more dependent segments.

In an embodiment the method includes reordering the received segments to allow the independent segment to be decoded first A third aspect of the invention relates to a device for partitioning and encoding an image for transmission of one or more regions of interest of said image, the image being composed of coding units, the device comprising a processing module for performing a second partitioning the image onto two or more segments of coding units comprising at least one independent segment which is encodable or decodable without any coding dependency on another of the segments and at least one dependent segment which is dependent on the independent segment for coding or decoding, the second partitioning being based on the portions of the first partitioning, at least one segment being employed per portion; and an encoder for encoding at least part of one of the portions in the independent segment and at least part of another of the portions is encoded in the dependent segment.

In an embodiment, exactly one segment being used for each portion, in the encoder is operable to encode the first portion of the image, according to a decoding order, in an independent segment and to encode subsequent portions of the image in a respective dependent segment.

In an embodiment, the one or more regions of interest are predetermined.

In an embodiment, exactly one segment being used for each portion, the first portion of a said region of interest is encoded in an independent segment.

In an embodiment, the maximum size of the portions is set to the size of the smallest region of interest of the image.

In an embodiment, the size of an independent segment is set to a selected size of at least one coding unit.

In an embodiment, the size of an independent segment is set to the size of one coding unit.

In an embodiment, coding units of part of a portion are encoded in an independent segment and the coding units of the other part of the portion are encoded in at least one dependent segment.

In an embodiment, a comparator is provided for comparing the encoded size of the first coding unit of each portion to one another, and wherein the first coding unit of the smallest size is encoded in an independent segment.

In one embodiment the device is configured to, in response to a request for a region of interest of the image, transmit an independent segment associated with said region of interest.

In an embodiment the processor is operable: to determine one or more segments of the image corresponding to the requested ROI; to determine whether or not the one or more segments includes an independent segment; and in the case where the one or more segments excludes an independent segment select an independent segment of the image for transmission with the dependent segment.

In one embodiment the selected independent segment corresponds to the independent segment of the image having the smallest encoding size.

In an embodiment, rein the independent segment preceding the first dependent segment of the region of interest in decoding order is selected.

In an embodiment the independent segment including said coding unit of the smallest size is selected.

In an embodiment each independent segment is provided with the same header.

A fourth aspect of the invention provides a device for requesting a region of interest of an image wherein the image is partitioned in accordance with the method of any embodiment of the first aspect of the invention, the device comprising a transceiver for transmitting a request for the region of interest; and receiving in response to the request for the region of interest an independent segment associated with the requested region of interest and at least one dependent segment of the image corresponding to the requested region of interest; and a decoder for decoding the independent segment before decoding the one or more dependent segments.

In an embodiment a reorder module is provided for reordering the received segments to allow the independent segment to be decoded first At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE INVENTION

Embodiments of the present invention, for example, may be applied in the context of remote browsing of video sequences by a client via a network such as the Internet in which the client may request data of one or more ROIs.

Figure 1:
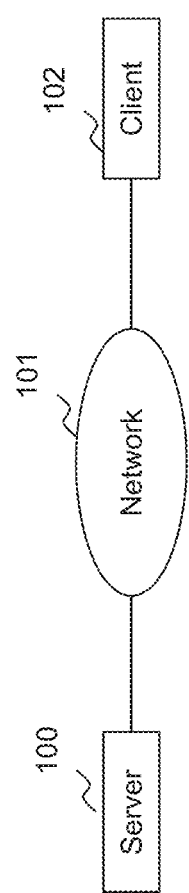
FIG. 1 schematically illustrates a communication system in which one or more embodiments of the invention may be implemented.

In one embodiment of the invention, interactive streaming of region of interests between a server 100 and a client 102 via a network 101 is considered. FIG. 1 schematically illustrates data communication system comprises a transmission device, in this case a server 100, which is operable to transmit data packets of a data stream to a receiving device, in this case a client terminal 102, via a data communication network 101. The data communication network 101 may be a Wide Area Network (WAN) or a Local Area Network (LAN). Such a network may be for example a wireless network (Wifi/802.11a or b or g), an Ethernet network, an Internet network or a mixed network composed of several different networks The data stream provided by the server 100 may be composed of multimedia data representing video and audio data. In some embodiments data streams may be stored on the server 100 or received by the server 100 from another data provider, or generated at the server 100. The server 100 is provided with an encoder for encoding video and audio streams in particular to provide a compressed bitstream for transmission that is a more compact representation of the data presented as input to the encoder. In order to obtain a better ratio of the quality of transmitted data to quantity of transmitted data, the compression of the video data may be for example in accordance with the HEVC format. To this end the server 100 is provided with a block based encoder typically a HEVC type encoder (or an extension of HEVC) that compress the video sequence while providing spatial random access to some regions of the frame. To enable spatial random access for interactive regions of interest in HEVC, each frame of the encoded video sequence is partitioned into different sub parts as will be described with reference to FIG. 2

An example of operation of the server 100 will be described with reference to FIG. 4. The server 100 may receive from the client 102 a request for a spatial part of the video: the region of interest (ROI). The server 100 then selects a part of the bitstream to send back to the client 102 and the encoded bitstream is then transmitted over the network to the client 102.

In one embodiment of the invention the protocol used for the transport of the data in the network is for example RTP ("Real-time Transport Protocol"). Thus, the network packets are of a RTP type. Each sub part of the HEVC bitstream is encoded in an NAL unit and embedded in one RTP packet when possible or fragmented into several RTP packets if the size of NAL unit is greater than the MTU (Maximum Transmission Unit) size.

In general the client 102 receives the transmitted bitstream and decodes the reconstructed bitstream to reproduce video images on a display device and the audio data by a loud speaker. The client 102 performs the ROI requests. In response to an ROI request the server 100 can select the corresponding sub part of the encoded bit stream to send to the client. The client thus receives the packetized bitstream that contains the encoded data of the requested region of interest. Received NAL units are decoded and then the decoded pixels corresponding to the requested region of interest are displayed. An example of the operation at the client side will be described with reference to FIG. 5.

In another embodiment, the standard protocol employed to transmit the media presentation over the IP network may be DASH: Dynamic Adaptive Streaming over HTTP. This standard has recently emerged and enables an association between a compact description of each media content of the media presentation and HTTP addresses to be created. Usually, this association is described in a file called a manifest file. In the context of DASH, this manifest file is a file also referred to as MPD (Media Presentation Description). When the MPD is sent to the client, the description of each media content can be easily made available to the client. By reading the manifest, the client is aware of the kind of media contents proposed in the media presentation and is aware of the HTTP addresses for downloading the associated media contents. As a consequent, it can decide which media content to download (via HTTP requests) and to play (decoding and play after reception of the media data segments).

In addition to this association, the DASH standard proposes splitting each media content into small periods of time. The time decomposition is added in the MPD file. The MPD file is therefore a file that describes the association between HTTP addresses and the compact description of each media content over a small period of time. With such means, the client downloads the desired media contents of the media presentation over the desired period of time.

In the context of DASH, File formats are used to encapsulate and describe encoded bitstreams as ISO. In particular the ISO Base Media File Format (ISO BMFF) is well-known for providing flexible and extensible format to describe timed encoded media bitstreams either for 'local' storage or access via a network or other stream delivery mechanism.

Figure 10:
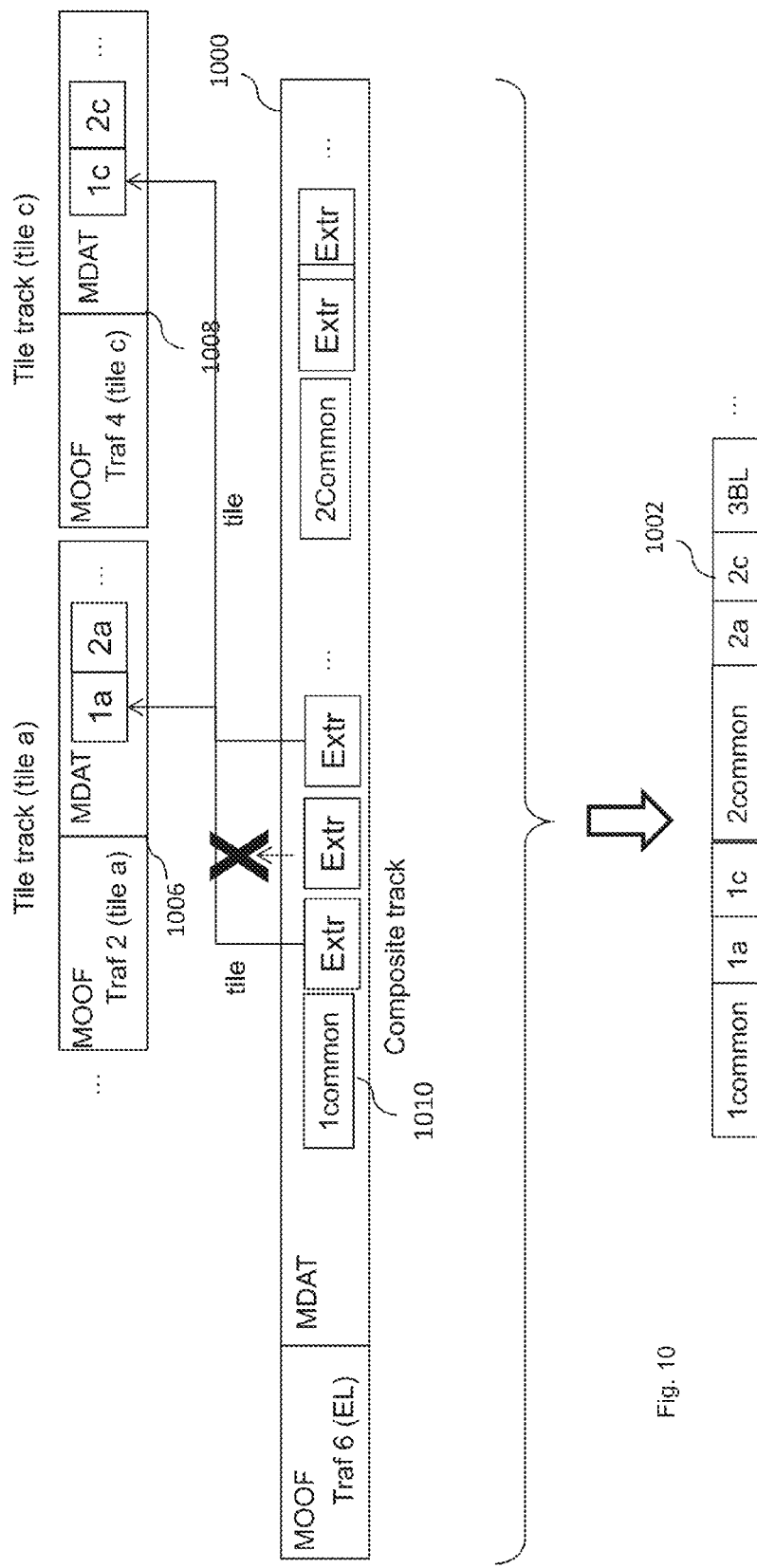
FIG. 10 illustrates the encapsulation of the encoded stream in a system stream in accordance with an embodiment of the invention.

A HEVC Bitstream is encapsulated using ISO Base Media File Format so that it allows accessing to ROIs with HTTP requests (see description of FIG. 10). In this embodiment, the client selects a region of Interest and creates the corresponding HTTP request(s) and sends them to the server. The server can extract the subparts of the encoded bitstream from the file format and send them to the client. The client can then decode the different subparts and then the decoded pixels corresponding to the requested region of interest are displayed.

Figure 2:
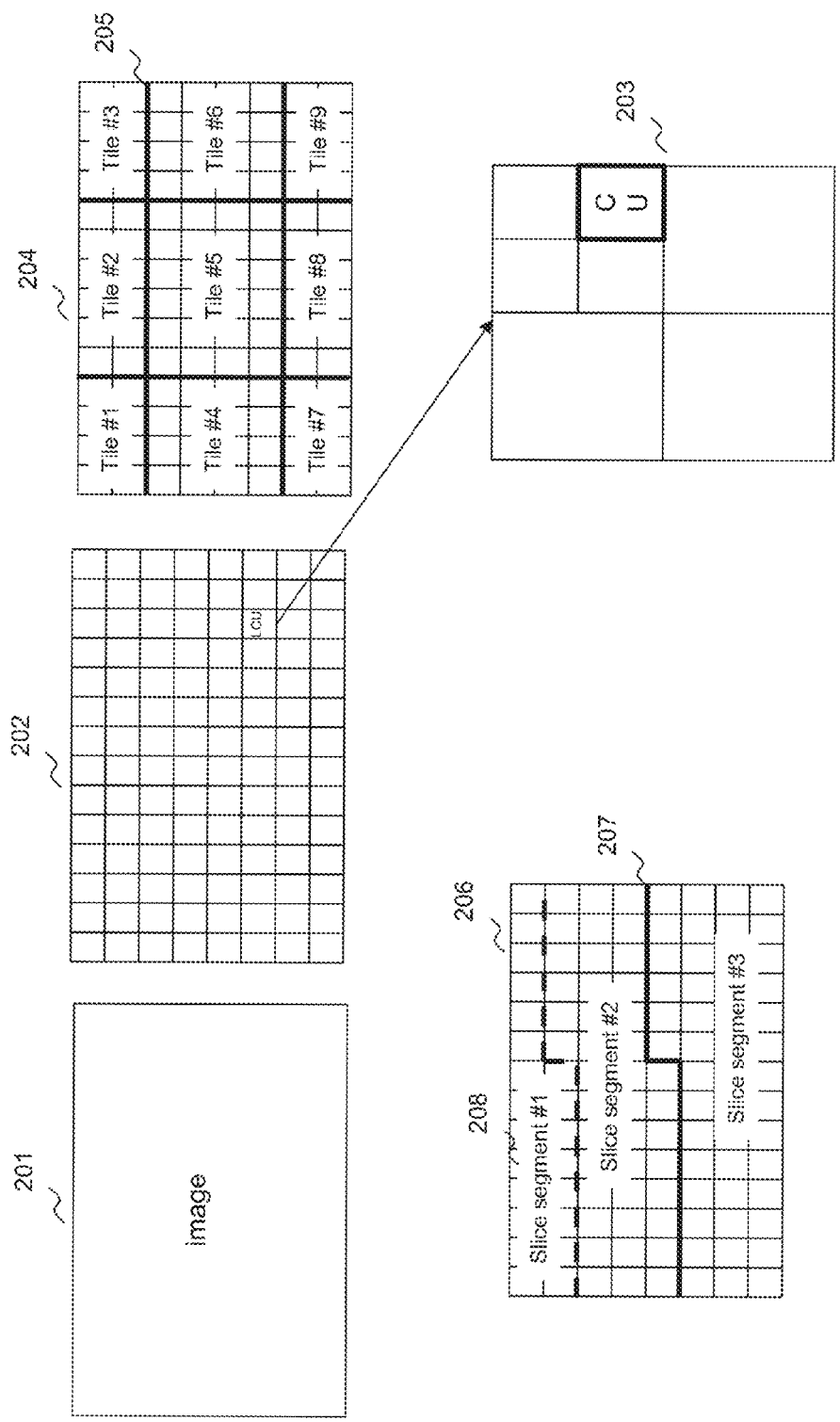
FIG. 2 schematically illustrates an example of frame partitioning in HEVC.

FIG. 2 schematically illustrates an example of the image coding structure used in HEVC. According to HEVC, the original video sequence is composed of a succession of digital images. Each digital image is represented by one or more matrices, the coefficients of which represent pixels.

Image 201 is divided into non-overlapping Largest Coding Units (LCUs) 202, which are generally blocks of size 64 pixels×64 pixels. Each LCU may in turn be iteratively divided into smaller variable size Coding Units (CUs) 203 using a quadtree decomposition. Coding units are the elementary coding elements and are composed of two sub units including a Prediction Unit (PU) and a Transform Unit (TU) of maximum size equal to the CU's size. Prediction Unit corresponds to the partition of the CU for prediction of pixels values. Each CU can be further partitioned into a maximum of 2 symmetric rectangular Partition Units or in asymmetric partitions. Transform units are used to represent the elementary units that are spatially transformed with by DCT. A CU can be partitioned into TUs based on a quadtree representation.

The HEVC standard provides different types of image segmentation mechanisms: partitioning into slice segments and partitioning into tiles.

In slice segment partitioning image 206 is divided into slice segments 208. A slice segment may correspond to a part of the image or to the entire image. Each slice segment contains an integer number of Largest Coding Units (LCUs).

In HEVC, two kinds of slice segments (208) are used: independent slice segments and dependent slice segments. Each slice segment is embedded in one NAL unit. The value of one flag specified in the slice segment header identifies whether or not the slice segment is independent. The difference between the two types of slice segments resides in the fact that data specified in the header of an independent slice segment defines all parameters necessary to decode the encoded CUs of the slice segment. In contrast, a dependent slice segment has a reduced size header and relies on the first preceding independent slice segment to infer any parameters needed for decoding which are not available in its header.

A set of one independent slice segment and consecutive dependent slice segments (if any available) represents a slice in HEVC. Two neighbouring coding units that belong to the same slice can be predicted from each other. On the contrary, if the CUs are not in the same slice all prediction mechanisms are broken by the slice boundary. Consequently, one coding unit can use data of another CU that is coded in another slice segment if the two slice segments belong to the same slice.

For instance, frame 206 has been divided into 3 slice segments. The two first slice segments form one slice and the last slice segment another. Slice segment #1 and #3 are also independent slice segments and slice segment #2 is a dependent slice segment. Coding units of slice segments #3 are coded independently of any of the CUs in the slice segment #2 since they are separated by a slice boundary 207. To decode the data of dependent slice segment #2, some information of the independent slice segment #1 must be retrieved to infer the encoding parameter of the dependent slice segment #2. In addition, prediction of information from CUs of the slice segment #1 to better compress coding units of the slice segment #2 is enabled.

HEVC also provides tile partitioning which enables a frame to be split into independently coded rectangular areas as depicted in frame 204. Each tile contains an integer number of LCUs. Inside tiles, LCUs are scanned in raster scan order. Similarly to slice boundaries, tiles break all prediction mechanisms at their boundaries. HEVC tiles have been introduced to allow parallel encoding and decoding of each frame. In HEVC, tiles are defined in a Picture Parameter Set NAL unit which is used to initialize the decoding process. PPS NAL unit includes syntax elements that specify the number of tile rows and the number of tile columns in the picture and their associated sizes. The tile locations (offset in bits) in one slice segment are identified with syntax elements available at the end of the slice segment header.

Tiles and slice segments may be jointly used but with some restrictions. One or both of the following sentences are verified:
    all LCUs of one slice (or slice segment) belong to the same tile; or
    all LCUs of one tile belong to the same slice (or slice segment)

This signifies that one slice (or slice segment) may contain several entire tiles or be only a sub part of a single tile. Secondly, a tile may contain several entire slices (or slice segments) or only be a sub part of a single slice (or slice segment).

HEVC provides several partitioning methods to enable decoding of spatial random access points in the frame. In exemplary embodiments of the invention, regions of interest are considered as rectangular areas within a frame. Consequently, tiles are employed to allow spatial random access to sub parts of an image.

In addition to enabling streaming of only useful encoded data corresponding to a ROI, each tile should be embedded in separate NAL units. Previous techniques consist in embedding each tile in one slice (therefore one independent slice segment and 0 or more dependent slice segments). For instance, FIG. 3, frame 300 is partitioned into a 4×4 tile grid. To access the predefined ROI 301, the slice segment NAL units corresponding to tiles 7, 8, 10 and 11 are selected and transmitted to the client.

This section presents how to partition an HEVC video sequence with HEVC partitioning tools to enable creation of regions of interest while ensuring that data for each region of interest can be transmitted independently. Such partitioning strategy has an impact on the coding efficiency since the introduction of tiles boundary breaks HEVC prediction mechanisms. Moreover, partitioning of each tile in one slice introduces an overhead due to the addition of encoding parameters to enable independent decoding of each tile. In the following section, the method proposed in an embodiment of the invention proposes a better partitioning method that enables spatial random access to any region of interest in the frame while reducing the amount of data required for transmitting each region of interest.

Figure 3:
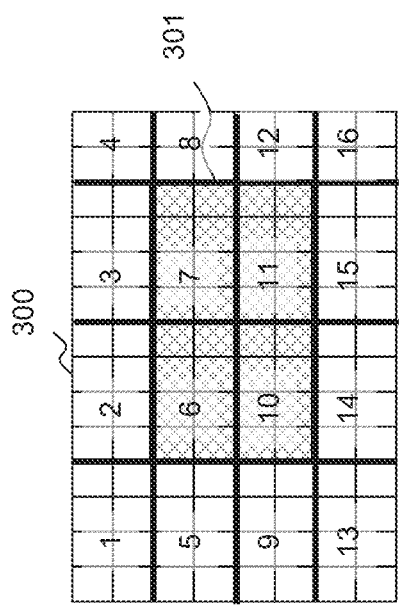
FIG. 3 schematically illustrates an example of partitioning of one HEVC Frame with a predefined ROI.
Figure 4:
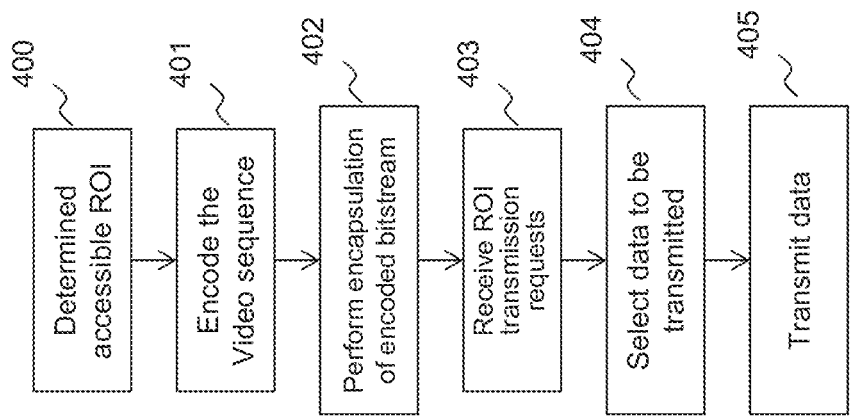
FIG. 4 is a flow chart illustrating steps of a server process in accordance with an embodiment of the invention.

FIG. 4 is a flow chart illustrating steps of an encoding and partitioning strategy performed by the server 100. An initial step 400 of the method involves determining the accessible regions of interests in the video sequence. Depending on the size of the video sequence or also on the content of video pictures, the spatial random access granularity should be adapted. Creating spatial random access areas requires breaking prediction mechanisms of HEVC and consequently the encoding bitrate is increased. In order to obtain a trade-off between coding efficiency and interactive ROI access possibilities, the maximal size of the tile is set equal to the minimal size of the possible region of interests. During this step a set of preferred regions of interest is determined. For instance FIG. 3 may correspond to the image configuration output of stage 400 which chooses a 4×4 tile grid with one predetermined ROI 301 composed of the tiles 7, 6, 10 and 11.

Next, the video sequence is encoded in step 401 with tile partitioning determined during step 400. This encoding step involves successively encoding tiles of each frame of the video sequence while ensuring that each tile may be independently decoded and parsed in order to provide encoded data with a granularity sufficient to access any region of interest. This stage is detailed with reference to the FIG. 6.

Each encoded NAL unit of the video sequence is then encapsulated in step 402 with appropriate protocols for transmission over the network. For network transport, RTP over IP protocol is preferably employed but the bitstream maybe also be embedded in a file format such as the ISO Base Media File Format that could be used to store the encoded bitstream for a delayed transmission over the network with DASH protocol.

In an application having interactive regions of interest, the user may select one predetermined region of interest or any other region of interest of the video sequence. The server receives a description for a set of region of interest that has been selected by a user on the client side. During step 403 the server parses parameters of the selected regions of interest. It will be appreciated that any method to indicate which region of interests is selected may be employed (for instance as defined in the article "Exploitation of Interactive Region of Interest Scalability in Scalable Video Coding by Using an XML-driven Adaptation Framework", Davy De Schrijver). Nevertheless, for ease of understanding it is considered that the width and height parameters of the selected ROI and also its coordinates are received.

The server then determines the set of tiles necessary to be decoded for computing all pixels needed for the selected ROI. From the selected set of tiles, the server determines the NAL unit to be transmitted. Depending on the partitioning of the frame into slice segments and into tiles, the server selects the NAL units in order to minimize the amount of data to be transmitted. This selection stage is managed by step 404 of FIG. 4. This process is detailed with reference to FIG. 8.

Finally, in step 405 the server streams the selected NAL units to the client using the appropriate network protocol (for instance RTP/RTSP or DASH).

In the case of DASH transmission, the client may indicate directly to the server the set of tiles required. The server then extracts the requested data from the ISO BMF file and streams the extracted data to the client using the HTTP protocol.

Figure 5:
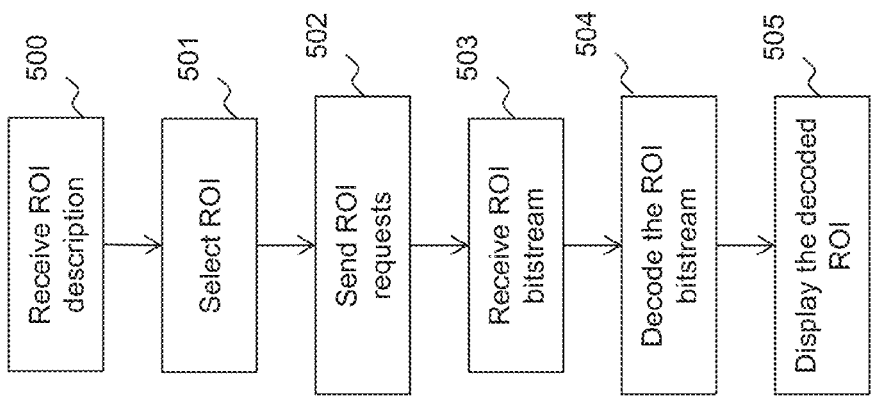
FIG. 5 is a flow chart illustrating steps of a client process in accordance with an embodiment of the invention.

FIG. 5 is a flow chart illustrating steps of a method of displaying ROIs in accordance with an embodiment of the invention. In order to describe the regions of interest accessible to the user, the client receives in step 500 from the server a description of the ROIs available and that can be selected by the user. In one particular embodiment, this description is the set of predetermined regions of interest 301 as depicted in FIG. 3. The set of predetermined ROI is displayed over the low resolution video sequence in order to represent the ROIs that could be requested for a view in high resolution. Metadata may also describe the content of the ROI or any other information suitable for user experience.

The user then selects one region of interest in step 501. The selected ROI could either be a predetermined ROI 301 or a non-predetermined ROI that is contained in a set of contiguous tiles (e.g. a sub area comprised in tiles #7, 8, 11 and 12 of FIG. 3).

The client then requests the selected ROI in step 502 to the server. For RTP over UDP streaming the requests may be transmitted with RTSP messages that indicate in their payload the coordinates and the size of the selected ROI.

In another embodiment, the grid of the tiles represented in frame 300 is transmitted in addition to the set of predetermined region of interests in stage 500. When the user selects one ROI that is not predetermined, the client identifies the indexes of tiles that correspond to the ROI. This enables the number of operations to be performed on the server side to be reduced since the client is able to directly determine the tiles to be requested. This case is typically done for DASH streaming: the tiles grid is described with help of an MPD description document that specifies the URL of the video segment to be requested for accessing a spatial area of a video sequence. The client thus directly requests the video segment corresponding to the set of tiles that contains the region of interest.

In response to the request messages, the client receives in step 503 the samples that contain the encoded data to be decoded in order to display the requested region of interests. To enable decoding of samples corresponding to the region of interests, the server may have sent more information than strictly needed. Indeed, depending on the requested ROI and the frame partitioning performed during the encoding process, it may not be possible to send only encoded data that compresses the pixels of the request ROI. Received NAL units are depacketized and then forwarded to the following processing stage 504 that aims at decoding the NAL units.

The HEVC decoder implemented in the client is fully compatible with the HEVC standard but in addition it provides some specific behaviour in order to be able to decode only sub parts of one frame in a video sequence.

The decoder supports that not all pixels of one frame are decoded. The client indicates to the HEVC decoder that encoded data corresponds only to a subset of the frame and that pixels not available in the provided encoded NAL unit should be considered as discard-able or not to be decoded.

In addition, if some reference information such as the decoded reference block in one frame is missing for the decoding one CU, the decoder may skip the coding unit or consider the decoded data as correct. Indeed, some samples outside the ROI may be transmitted to the decoder even if not decodable. Nevertheless, such data should not be displayed by the client since it is outside the ROI.

Optionally the decoder may provide some other specific features:

For example the first independent slice segment received by the client is not in the requested ROI, the decoder may skip the decoding of CUs in this independent slice segment after having parsed header parameters. Because it knows that the pixel data of the CUs is not useful for the region of interest decoding, only the header data is necessary. This allows a faster decoding of the requested region of interest.

In another embodiment, the decoder reorders the received NAL units before the decoding process in order to start the decoding process by an independent slice segment. This is possible because in the specific encoder described in step 603 all independent slice segment parameters defined in the headers are identical (except parameters used to determine the address of the first CU encoded in the independent slice segment) and thus the decoder can use any of them to decode any dependent slice segments independently regardless of the classical decoding order and slice partitioning constraints. This specific decoder allows the overhead data to send to be minimised in some cases as will be described in with reference to FIG. 8.

Finally, the client displays 505 a cropped area of the decoded data that corresponds to the region of interest.

Figure 6:
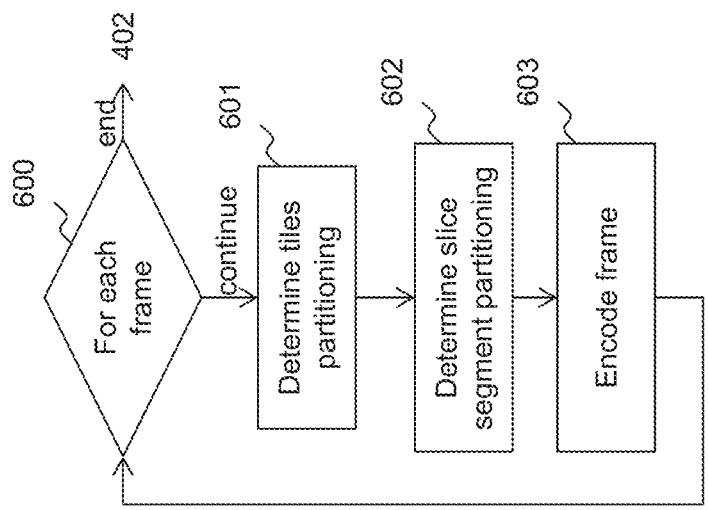
FIG. 6 is a flow chart illustrating steps of an encoding process in accordance with an embodiment of the invention.

FIG. 6 is a flow chart illustrating steps of an encoding process performed by the server in step 401 of FIG. 4. The encoding is a processing loop 600 performed on each image of the video sequence.

Tile Partitioning

In an initial step 601 partitioning parameters for a first partitioning of the image into image portions. The image portions of this partitioning are referred to as tiles. First, the tile grid parameters are determined in order to enable a fine grain spatial random access, i.e. the size of tiles is defined such that a functional and convenient access to ROIs of the image is provided while limiting the impact on the coding efficiency. The tile size is set equal to the minimum size of an accessible ROI. The HEVC standard specifies a minimal tile size depending on the encoding profile and level of the decoder. If the determined size of tile in stage 601 is below this minimum, the tile size of the partitioning is set equal to the HEVC minimum size.

Tile partitioning of stage 601 sets out to provide spatial random access to a sub part of the video sequence by breaking all prediction mechanisms introduced by HEVC compression. In addition, to this first partitioning, encoded data corresponding to each tile must be embedded in different NAL units in order that the data to be transmitted in step 405 of FIG. 4 may be selected. Indeed, if all tiles are embedded in a single NAL unit, it is not possible to access a sub part of the frame without transcoding each encoded NAL unit. This additional processing is saved by an embodiment of the proposed invention.

It may be noted that HEVC allows more than one tile to be embedded in one slice segment. For instance, one slice segment may contain two consecutive tiles in raster scan order. In such a case, it is not possible to transmit one of the tiles independently of the other. For interactive ROI features, this may not suitable since it increases the coded size of the bitstream without introducing a finer spatial access granularity. In the context of embodiments of the invention, without loss of generality, the term tile refers to the minimal accessible areas in one frame. Consequently, several HEVC tiles in the same slice segment may be considered as one "tile".

In step 602 a second partitioning is performed in which the image is partitioned into image portions referred to as slice segments. In order to embed each tile in a different respective NAL unit, the encoder employs at least one slice segment per tile. The first tile of the frame contains an independent slice segment. The subsequent tiles may contain dependent slice segments.

Even if a dependent slice segment uses data of CUs coded in the previous independent slice segment or dependent slice segments, independent decoding of all the dependent slice segments of a tile is enabled by virtue of the tile boundaries which break all dependencies except for the slice header. In order to be decoded, dependent slice segments require that the header of the previous independent slice segment is available.

Thus for the client to be able to decode any tile of the frame, the server should transmit a first independent slice segment in addition to the dependent slice segments of the requested tiles to the client in order to ensure that all parameters of the header are available for the decoding process. The selection of the independent slice segments to be transmitted is detailed with reference to step 802 of FIG. 8.

In comparison to previous techniques in which one independent slice segment is employed for each tile, the proposed slice segment partitioning strategy of step 602 enables the bitrate to be advantageously economised by reducing the size of the slice header for each tile. For a large number of tiles used in each frame of one video sequence (common in very high resolution sequences e.g. 8K4K) the amount of bitrate saved is significant: The header size of an independent slice segment is typically from 2 up to almost 4 times bigger than a dependent slice segment header. For example, for a video sequence 1920×1080 with only 25 tiles per frame the saved bitrate is more than 60 kbps.

Figure 7:
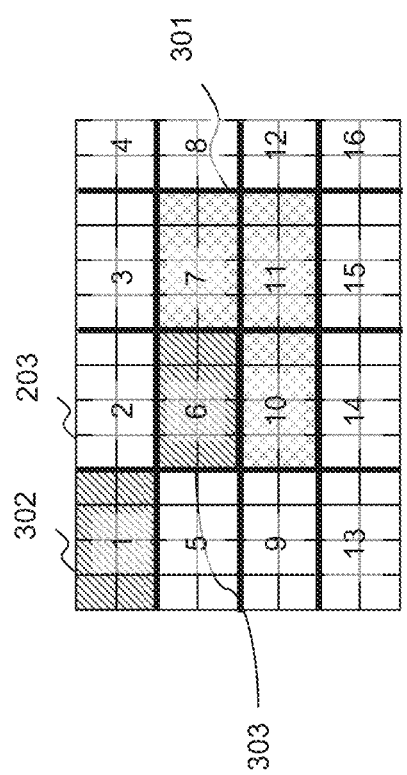
FIG. 7 schematically illustrates an example of an encoded frame in accordance with an embodiment of the invention.

In one embodiment of the invention, exactly one slice segment is used for each tile. The first tile of the frame is encoded with one independent slice segment and all the other tiles are each encoded with one dependent slice segment In another embodiment, an independent slice segment is used for the first tile of each predetermined region of interest instead of a dependent slice segment. Even if this increases the bitrate of the encoded video sequence, it provides a simpler selection process in step 404 of FIG. 4 when one predetermined ROI is requested. FIG. 7 schematically illustrates slice segment partitioning of the frame 300 with a predetermined region of interest 301 in accordance with such an embodiment of the invention: hatched tiles (tiles 1 and 6) correspond to independent slice segments and the others to dependent slice segments.

In one embodiment, more than one slice segment per tile may be employed. Typically, the slice segment size is limited to the MTU size (the maximal size of the packets on the network), in order to have exactly one slice per network packet. Therefore, for high quality encoding and depending on the content more than one slice segment per tile may be used.

In another embodiment, several small independent slice segments may be used in the image. The minimal size in pixels of a slice segment is one LCU, so that the encoder may create several independent slice segments of at least one LCU. The advantage of this configuration is that a minimal overhead will be necessary to transmit any region of interest to the client. Indeed it may be necessary to send an additional independent slice segment in addition to the requested region of interest. It is thus advantageous to minimize the size of the additional independent slice segment. This will be clear in description of FIG. 8 and step 802 of selection of independent slice segments.

In such an embodiment, slice partitioning step 602 and encoding step 603 may be adapted to benefit from the selection process of NAL units. A small number of CUs of one tile are encoded in the independent slice segment instead of all of the CUs of the tile: during the encoding process step 603 of each CU (of the tile to be embedded in one independent slice segment) the current size of the independent slice segment is compared with a predetermined threshold. If the slice segment size is below the threshold, the following CU is embedded in the independent slice segment. Otherwise, if the slice segment size is greater than the threshold size, a new dependent slice segment is started and all remaining coding units of the tile are added to this dependent slice segment. Such an embodiment allows the size of the independent slice segment to be transmitted in addition to the tile requested by the client to be minimised. The threshold parameter should be defined such that the number of CUs in the independent slice segments is minimal. If the threshold parameter is set to zero, a single CU will be encoded in the independent slice segment.

Figure 9:
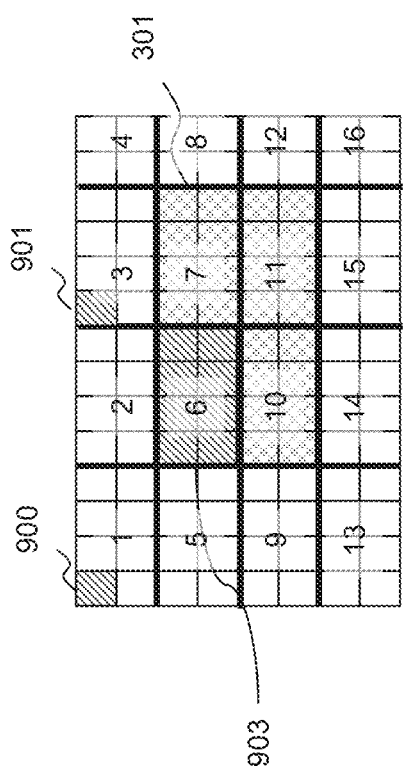
FIG. 9 schematically illustrates another example of an encoded frame in accordance with an embodiment of the invention.

In another embodiment, the encoded sizes of the first CU of each tile are compared in order to identify the CU which has the smallest encoded size. A new independent slice segment that contains only this CU is created. This enables one independent slice segment with the lowest possible encoded size to be obtained. FIG. 9 schematically represents slice segments of one frame encoded in accordance with this last embodiment. One independent slice segment 900 of one CU is created for the first tile to enable decoding of the entire frame. The independent slice segment 901 has been created since the encoded size of the first CU of tile 3 is smaller than the CU in 900. This independent slice segment will be selected and transmitted when the requested ROI does not contain an independent slice segment. The last independent slice segment 903 is created to simplify the selection process when the predetermined ROI 301 is requested.

For intra frames, HEVC video encoding in step 603 is performed taking into account the selected tile and slice structure.

To compress the coding units in inter frames, each coding unit is predicted from a reference block in a previously encoded frame. The reference block coordinates are determined with the help of a motion vector that is determined for each inter block. As a consequence, the coding unit of one tile may be predicted from a block located anywhere in the reference picture. The set of a tile at the same position in several frames should be independently decodable to ensure that the ROI may be decoded without reference to missing reference information for each frame of the video sequence.

Consequently, it is necessary to restrict reference block location within the collocated tile in the reference frame. To do so, the search window is restricted during the motion estimation process to ensure that the motion vector will not point to a reference block that contains pixels outside the boundaries of the collocated tile.

In HEVC, loop filters (deblocking filter and Sample Adaptive Offset filter) are applied to each frame. To avoid propagation of pixels information from one tile to another, application of loop filters at the tile boundaries is disabled. This may be done by setting the value of loop_filter_accross_tiles_enabled_flag syntax element to 0 in the PPS.

In order to have an easy selection of the independent slice segment to send, it is necessary advantageous to constrain the encoder to have almost the same headers for all the independent slice segments. The encoder manages to employs the same encoding parameter values for each encoded independent slice segment in the frame except for parameters used to determine the address of the first CU encoded in the independent slice segment. This encoding constraint is not so restrictive since parameters defined in the independent slice segment header are not likely to change from one tile to another. This constraint enables any of the independent slice segments to be used to retrieve encoding parameter values for decoding one tile.

Figure 8:
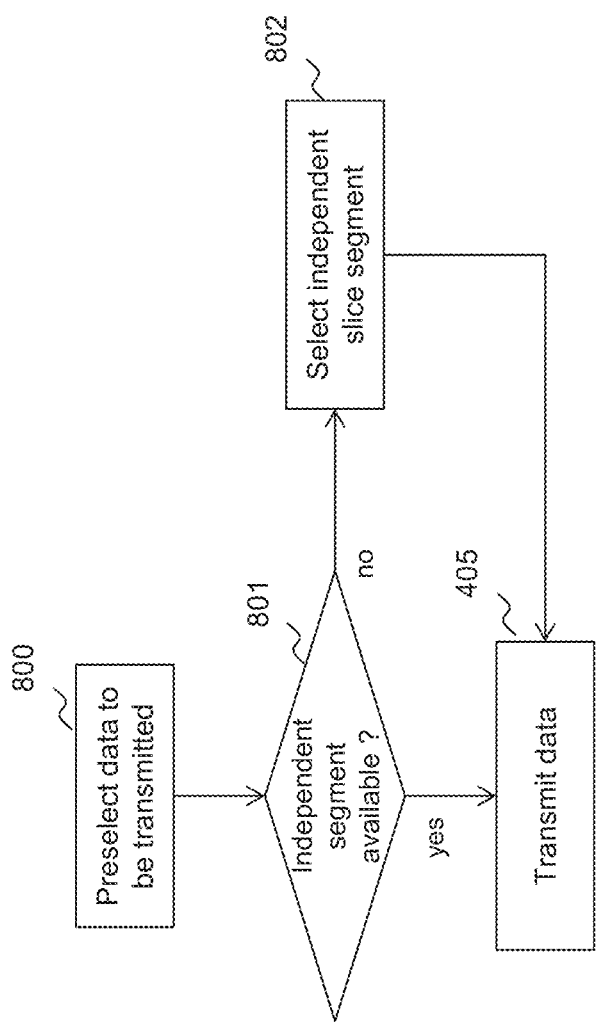
FIG. 8 is a flow chart illustrating steps of a selection process of NAL units for a requested ROI in accordance with an embodiment of the invention.

FIG. 8 is a flow chart illustrating steps of a selection process (step 404, FIG. 4) of NAL units to be transmitted in response to a ROI request is described now with reference to FIG. 8. The selection starts by a pre-selection 800 of NAL units corresponding to the tiles that contain pixels in the ROI. The coordinates and the size of the ROI requested by the client are used to identify the tiles which share pixels with the ROI. Each slice segment NAL unit which comprises data of one tile in the set of selected tiles is marked as pre-selected.

As previously mentioned, it may be possible to have several HEVC tiles in the same slice segment. The previous statement also applies to this case in which all slice segments containing data of at least one selected tile, are selected.

Then, in accordance with one embodiment the first pre-selected slice segment in order of decoding is analyzed in step 801 to identify if the slice segment is an independent slice segment. If true, the set of slice segments can be independently decoded and is therefore marked as selected for the network transmission to the client in step 405.

Otherwise, the pre-selected NAL units starts with a dependent slice segment and cannot be decoded since slice header parameters are missing. Thus it is necessary to select an independent slice segment in step 802.

In step 802, all unmarked NAL units of the image 201 are then processed to identify independent slice segment NAL units of the frame which form a second set of NAL units. The NAL unit that precedes the first dependent slice segment of the ROI in decoding order and preferably which has the lowest size among the second set of independent slice segment NAL unit is marked as selected. This NAL unit is then transmitted in step 405 of FIG. 4 in addition to the set of pre-selected dependent slice segment NAL unit.

For instance, if the requested ROI is the predetermined ROI 301 in frame 300 of FIG. 7, the ROI includes an independent slice segment 303 and thus stage 802 is not applied. On the other hand, if the requested ROI is composed of tiles 7, 8, 11 and 12, step 802 applies. It is supposed that the size of independent slice segment 302 corresponding to tile 1 is smaller than the size of the independent slice segment 303 corresponding to tile 6. In that case, stage 802 selects the independent slice segment of tile 1 which is transmitted in addition to the dependent slice segments corresponding to tiles 7, 8, 11 and 12.

In the case of a specific decoder adapted to embodiments of the invention being used by the client, it is possible to adapt steps 801 and 802 in another embodiment. It is assumed that the decoder (step 504) reorders the received NAL units before the decoding process in order to start the decoding process by an independent slice segment.

This permits step 801 to be simplified since not only the first but all pre-selected slice segment are analysed to identify if one independent slice segment is available among the set of pre-selected slice segments. Consequently, step 802 is applied only when the pre-selected NAL units are all dependent slice segments.

For instance in FIG. 9, if the requested ROI is composed of tiles 2 and 3, in the first embodiment independent slice segment 900 is transmitted in addition to slice segments corresponding to tiles 2 and 3. In this last embodiment, the independent slice segment 900 is not required since segment 901 is available in the set of segments corresponding to the requested ROI. The decoder reorders the NAL unit to start the decoding by the independent slice segment NAL unit 901 and then decodes the 2 remaining dependent slice segments.

Step 802 is also modified to select the lowest size independent slice segment in the whole frame, not only in the part preceding the first dependent slice segment of the ROI in the decoding order.

Finally, selecting an independent slice segment which is not the one preceding the first tile in the ROI in raster scan order, amounts to changing the slice boundaries in the frame. For instance, when requesting tiles 8 and 9 of FIG. 9 the transmitted independent slice segment is 901. Consequently, these two tiles are considered as being in a slice which starts at the tile 3 instead of the slice which is started at tile 6. Nevertheless, it has no impact on the decoding process since slices and tiles boundaries are always mixed up which prevents any decoding errors.

Encapsulation of such a kind of encoded bitstream in an ISO BMFF file may be done to ease the access to tiles in context of HTTP streaming. An example of such a technique is described in GB1300953.5.

This ISO BMFF format is object-oriented; it is composed of building blocks, called boxes, sequentially or hierarchically organised, that describe the timing, structure and media information for encapsulated bitstreams. In this file format, the video bitstream itself is contained in mdat box and it is described by a track box. The moof box contains all ISO BMFF metadata (including track definitions). The track represents a timed sequence of samples where a sample corresponds to all the data associated with a single timestamp.

Step 402 following the principle of the technique of GB1300953.5 involves defining a new type of tracks called "tile track" that conveys data relative to one tile (1006, 1008 in FIG. 10). One tile track is generated for each tile of the grid identified in step 601.

A composite track that only references those specific "tile tracks" is also generated 1000 and an extended extractor that allows referencing "tile tracks" from the composite track is employed. Data in the composite track are shared with all tile tracks.

In that context, the independent slice segment which has the minimum size (901 in the example of FIG. 9) is added to this composite track in the Common part 1010. This enables efficient and simple access to the data required for decoding each tile track in the file format.

The client can thus obtain a region of interest by requesting by HTTP, in step 502 of FIG. 5, each required tile-track and the associated composite track. The client will receive the bitstream in step 503 in the file format form presented in FIG. 10 with several tile tracks and one composite track. The decoding is then done in two steps: first the file format is decoded to reconstruct the bitstream 1002 and then this bitstream is decoded by the client decoder (step 504) before displaying the region of interest (step 505 of FIG. 5).

Embodiments of the invention enable random access to be provided to any spatial part in the frame through independent parsing and decoding The embodiments enable unnecessary parts of the bitstream to be removed thereby resulting in reduced overhead. Improved encoding and reduced overhead (limited number of full slice header) are thereby provided.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of partitioning and encoding an image for transmission of one or more regions of interest of said image, the image being composed of coding units, the method comprising:
performing a first partitioning of the image into two or more portions of coding units, all prediction mechanisms being broken at their boundaries, a reign of interest comprising at least one portion; and
performing a second partitioning of the image onto two or more segments of coding units comprising at least one independent segment which is encodable or decodable without any coding dependency on another of the segments, the size of the independent segment being set to a selected size of at least one coding unit, and at least one dependent segment which is dependent on header parameters of the independent segment for coding or decoding, the second partitioning being based on the portions of the first partitioning, at least one segment being employed per portion;
encoding the image according to said first and second partitioning;
wherein at least part of one of the portions is encoded in the independent segment and at least part of another of the portions is encoded in the dependent segment;
transmitting an independent segment associated with a region of interest of the image in response to a request for the region of interest.

2. A method according to claim 1 wherein, exactly one segment being used for each portion, the first portion of the image, according to a decoding order, is encoded in an independent segment and subsequent portions of the image are encoded in a respective dependent segment.

3. A method according to claim 1 wherein the one or more regions of interest are predetermined.

4. A method according to claim 1 wherein, exactly one segment being used for each portion, the first portion of a said region of interest is encoded in an independent segment.

5. A method according to claim 1 wherein the maximum size of the portions is set to the size of the smallest region of interest of the image.

6. A method according to claim 1 wherein the size of an independent segment is set to the selected size of one coding unit.

7. A method according to claim 1 wherein coding units of part of a portion are encoded in an independent segment and the coding units of the other part of the portion are encoded in at least one dependent segment.

8. A method according to claim 1 wherein the encoded size of the first coding unit of each portion are compared to one another, and the first coding unit of the smallest size is encoded in an independent segment.

9. A method according to claim 1 comprising in response to the request for an ROI,
- determining one or more segments of the image corresponding to the requested ROI;
- determining whether or not the one or more segments includes an independent segment; and in the case where the one or more segments excludes an independent segment
- selecting an independent segment of the image for transmission with the dependent segment.

10. A method according to claim 9 wherein the selected independent segment corresponds to the independent segment of the image having the smallest encoding size.

11. A method according to claim 9 wherein the independent segment preceding the first dependent segment of the region of interest in decoding order is selected.

12. A method according to claim 9 wherein coding units of part of a portion are encoded in an independent segment and the coding units of the other part of the portion are encoded in at least one dependent segment and wherein the independent segment including said coding unit of the smallest size is selected.

13. A method according to claim 1 wherein each independent segment is provided with the same header.

14. A device for partitioning and encoding an image for transmission of one or more regions of interest of said image, the image being composed of coding units, the device comprising a processing module for performing a first partitioning of the image into two or more portions of coding units, all prediction mechanisms being broken at their boundaries, a region of interest comprising at least one portion; and performing a second partitioning of the image onto two or more segments of coding units comprising at least one independent segment which is encodable or decodable without any coding dependency on another of the segments, the size of the independent segment being set to a selected size of at least one coding unit, and at least one dependent segment which is dependent on header parameters of the independent segment for coding or decoding, the second partitioning being based on the portions of the first partitioning, at least one segment being employed per portion;

an encoder for encoding at least part of one of the portions in the independent segment and at least part of another of the portions is encoded in the dependent segment; and a transmitter for transmitting an independent segment associated with a region of interest of the image in response to a request for the region of interest.

15. A non-transitory computer-readable storage medium storing instructions of a computer program for implementing a method, according to claim 1.

* * * * *